United States Patent [19]

Varnas et al.

[11] 4,263,027

[45] Apr. 21, 1981

[54] MULTI-VORTICAL SEPARATOR

[76] Inventors: Joseph Varnas, 286 N. Allen Ave., Pasadena, Calif. 91106; Horst W. Schneider, 900 S. 6th Ave. #19, Hacienda Heights, Calif. 91745

[21] Appl. No.: 19,831

[22] Filed: Mar. 12, 1979

[51] Int. Cl.³ ............................................ B01D 45/16
[52] U.S. Cl. ....................................... 55/346; 55/348; 55/440; 55/448; 55/DIG. 14; 209/144; 210/512.1
[58] Field of Search ................ 55/346, 348, 440, 463, 55/447, 448, 461, DIG. 14, 442–446; 209/144, 211; 210/512 R, 512 M

[56] References Cited

U.S. PATENT DOCUMENTS

| B 330,719 | 3/1976 | Bielefeldt | 55/461 |
|---|---|---|---|
| 1,632,813 | 6/1927 | Wittemeier | 55/444 |
| 3,077,714 | 2/1963 | McIlvaine | 55/461 |
| 3,358,580 | 12/1967 | Freese et al. | 55/440 |
| 3,948,771 | 4/1976 | Bielefeldt | 55/461 |

FOREIGN PATENT DOCUMENTS

| 598589 | 12/1925 | France | 55/444 |
|---|---|---|---|
| 21912 | 6/1930 | Netherlands | 55/444 |
| 34314 | 12/1934 | Netherlands | 55/444 |

*Primary Examiner*—Frank W. Lutter
*Assistant Examiner*—Gregory N. Clements
*Attorney, Agent, or Firm*—Christie, Parker & Hale

[57] ABSTRACT

A multi-vortical separator for removing particulate matter suspended in a transport medium is described. A single pressure sealed enclosure has a plurality of contoured columnar baffles symmetrically arranged in quadruplets, the baffles having cooperating saddle portions that define four vortical flow initiating flow splitters. The columnar portions of the baffles cooperate to define regions of rotating fluid wherein the transport medium rotates and particulate matter, suspended within the medium, is separated therefrom by centrifugal action. The separated particulate matter impinges on the columnar surfaces of the baffles and falls in a gravity fall manner into a collection bin. A plurality of vortex finder tubes, placed within the regions of rotating fluid, receives cleansed air from a central portion of the regions and guides it to the separator outlet.

75 Claims, 10 Drawing Figures

MULTI-VORTICAL SEPARATOR

BACKGROUND OF THE INVENTION

1. Field of the Invention

This application relates to multi-vortical separator and more particularly to a separator in a pressure sealed enclosure that includes a plurality of regions containing fluid rotating in a vortical manner.

2. Description of the Prior Art

Cyclones and vortical separators for removing for removing particulate matter in a transport medium are known in the prior art. Cyclones rely on the principle of centrifugally removing particulate matter from a transport medium by rotating the medium in some confined enclosure. The particulate centrifugally removed from the transport medium falls to a collection bin while the cleansed air is guided by a conduit to the outlet of the cyclone. One class of device is described by Rastatter in U.S. Pat. No. 3,543,931. Operation of the described device relies on the use of a plurality of modules which are independently connected to a common header system. Each module, which includes a manifold system, is connected to a plurality of conical cyclones each of which is connected to the manifold system. Each module can be viewed as an independent cyclone containing fluid rotating in a vortical sense for separating material suspended in the fluid. Each cyclone unit is in fluid communication with the inlet to the cyclone, as well as with the outlet of the cyclone.

Multi-cyclones of this design have inherent problems. The multi-cyclones represent essentially a plurality of scaled down single cyclones of conventional design operating in fluid parallel communication. The Reynolds numbers of the rotating fluid within the cyclones are small and boundary layer growth along the inner walls of the cyclones become increasingly pronounced with diminishing vortex diameter. The boundary layer growth greatly impares the efficiency gains that theoretically can be achieved with a multi-cyclone device over a single cyclone. Below a certain vortex size, no improvements over a single cyclone can be attained. As a result, initial investment for multi-cyclones, as well as the cost for upkeep and repair, are substantially higher than for single cyclones.

Another such cyclone is described by Dygert in U.S. Pat. No. 2,941,621. Operation of the described cyclone (centrifugal separators) relies on the use of a rotating transport medium so as to centrifugally separate therefrom particulate matter suspended within the medium. The described device contains in one enclosure a plurality of tubular centrifugal separators for effecting the separation of the particulate from the transport medium. The inlet of each of the tubular separators is in fluid communication with the inlet to the multi-cyclone, and the outlet of each of the tubular separators is in fluid communication with the outlet of the multi-cyclone. Each of the tubular separators has a plurality of swirler vanes at the inlet to the separator for initiating vortical flow to the transport medium entering each tubular separator.

Devices of this design have inherent problems in that they are very sensitive to upstream disturbances and to the nature of the incoming flow. Additionally, the overall particulate separation efficiency usually suffers from losses due to the low quality and aerodynamic inefficiency of the swirler vanes. Dictated by cost efficiency considerations, the swirler vanes are usually in the form of arched flat plates rather than shaped foils. Thus in order to obtain sufficient and stable rotation of the inletted flow, eight or more vanes per cyclone chamber circumference must be provided. The cross-sectional area between vanes becomes relatively small and the device can suffer from clogging where materials that are prone to packing are to be separated from the transport medium.

SUMMARY OF THE INVENTION

The present invention contemplates a multi-vortical separator for inertial separation of particulate matter suspended in a fluid, the separator enclosing a chamber having an inlet and an outlet, means for introducing the fluid into the chamber through the inlet, a plurality of spaced-apart contoured columnar baffles within the chamber for defining a plurality of regions, the baffles being shaped for causing fluid to rotate in opposite sense in adjacent regions, and means located between the baffles for guiding fluid from a central portion of each region to the outlet.

The rotary nature of the fluid in the regions is initiated by means of four contoured converging nozzles or flow splitters which are formed by the cooperation of saddle portions of the contoured baffles that are arranged in quadruplets. Each quadruplet is defined by four baffles, each baffle having a major and a minor axis, the major axis of each baffle orthogonal to the major axis of an adjacent baffle.

In one embodiment of the herein described invention, the columnar portion of each baffle is outwardly flared with respect to its minor axis, the flare commencing approximately two-thirds of the length of the columnar portion from the saddle portion. The outward flaring of the columnar portion of the contoured baffles causes a reduction of the region of rotating fluid radially inward such that the speed of the vortex, as measured as stations progressively closer to the base, increases. Particulate matter entrained in the flow or transport medium is emitted therefrom due to centrifugal action within the regions. The particles impinging upon the surface of the baffle fall in a gravity fall manner to a collection bin beneath the baffle. Due to the increased rotary velocity of the rotating fluid within the regions, a pressure differential exits between the flow at a station immediately below the flow splitters, and a station downstream from said flow splitters such that the flow reverses from a downwardly direction to an upward direction through the center of the vortex. A plurality of vortex finder tubes located within the region receives the upwardly rising cleansed flow from the center of the vortex and guides it to the outlet of the separator.

In one embodiment, the contoured baffles are maintained in position within the separator by means of keyed interfaces between the base of the baffles and a supporting screen. The baffles are intentionally loosely fit on the screen to avoid the build-up of strain and thermal stresses due to the vortical flow within the regions. The loose fit permits a slight flow induced vibration of the baffles, the vibration affecting a self-cleaning and the discharge of any particulate matter that may impinge on the surface of the baffle.

The four contoured baffles that form a quadruplet and that surround each region of rotating fluid are oriented at right angles to each other. The baffles control the boundaries of the individual vortices and prevent the matter separated from the transport medium from migrating across from one vortex into an adjacent vortex.

Various flow patterns such as helical, cylindrical, converging and reversed (cyclonic) vortical flow are achieved by using appropriate contoured baffle geometries such as constant cross-section and gradually or exponentially variable shaping of the baffle profiles along the baffle lengths.

An alternate embodiment of the multi-vortical separator includes a plurality of core flow admission tubes that are in fluid parallel arrangement with the flow splitters of the baffles that comprise each quadruplet. The core flow admission tubes admit a portion of the inletted air flow directly into the center of the vortices, thus increasing the flow-through capacity of the separator. A plurality of downstream vortex finder tubes are located within the region of rotating fluid, the tubes having an inlet that is upstream from the base portion of the baffles. The vortex finder tubes are in fluid communication with the outlet of the separator so that cleansed air entering the vortex finder tubes is exited from the separator through the outlet. Particulate matter emitted from the rotating vortices within each of the regions falls in a gravity fall manner into a collection bin located beneath the baffles. The vortex finder tubes have an expansion region in the vicinity of the outlet of the separator to provide a low energy loss outlet for the cleansed air.

The multi-vortical separator can be considered as a plurality of individual separators in fluid communication with one another as well as with the fluid input and fluid output. Each of such separators defined by the quadruplet of contoured baffles that define the regions of rotating fluid. Each contoured baffle of each separator comprising no more than a quarter section of adjacent separators.

DETAILED DESCRIPTION

Figure 1:
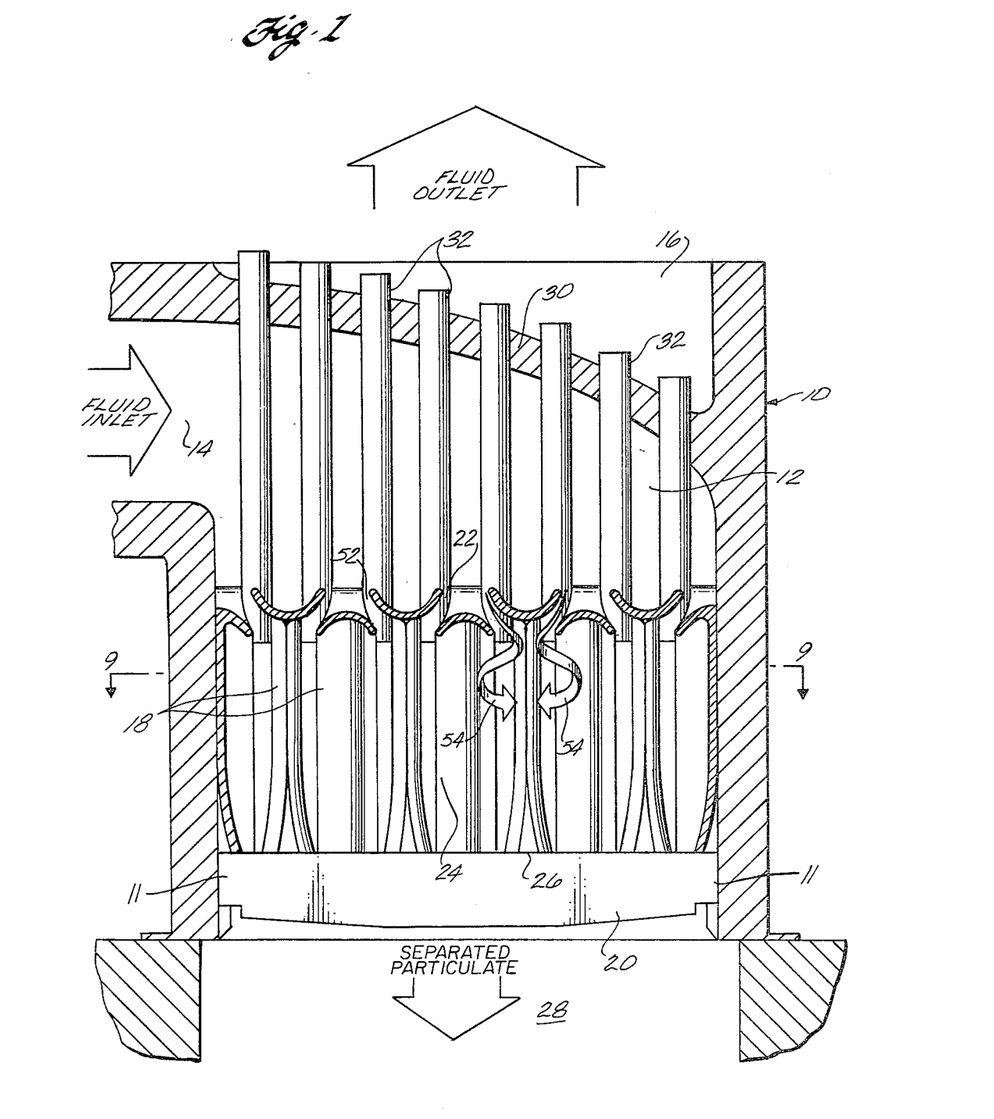
FIG. 1 is a partially cut away view of the multi-vortical separator constructed in accordance with the present invention.

FIG. 1 shows in detailed cross-section an embodiment of the present invention. The multi-vortical separator includes an enclosure 10 fabricated preferably from a steel reinforced ceramic material. Within the enclosure 10 is a chamber 12 having an inlet 14 and an outlet 16. Located within the chamber 12 and in fluid communication with the inletted air is a plurality of contoured columnar baffles 18. The baffles, formed preferably of castible ceramic material, are supported within the chamber 12 by removable supporting cross beams 20 that extend laterally between the sides 11 of chamber 12. The baffles 18 are loosely inserted and rest by gravity on the removable cross beams 20 thereby permitting installation and replacement of the baffles from a station immediately below the cross beams. The contoured baffles have a saddle-shaped inlet portion 22, a columnar portion 24 and a base portion 26. The baffles 18 are arranged within the chamber 12 such that a major axis of the columnar portion 24 is at a right angle to the major axis of an adjacent baffle 18.

Maintaining the baffles in place is accomplished by means of keying the contoured baffle base portion 26 to the cross beams 20. The contoured baffles 18 are intentionally loosely fit on the cross beams 20 such that a slight flow induced vibration of the baffles affects self-cleaning of the baffles. The loose fit also avoids the build up of thermal stress that is created by the temperature differentials arising out of the cleansing of hot gases. The columnar portions 24 of four adjacent baffles are arranged in a quadruplet and define a region wherein inletted air rotates in a vortical sense. The saddle portions 22 of the four baffles 18 define at least four flow splitters 52 for initiating the rotation of the fluid within the region defined by such four baffles. Immediately below the baffle base 26 there is located particulate collector 28. Dividing the chamber 12 into inlet portion 14 and outlet portion 16 is structural wall 30. Located between a central portion of the regions defined by the baffles in the outlet 16 is a plurality of vortex finder tubes 32.

In a typical operation, the baffles are vertically oriented within chamber 12. A transport medium such as air, containing particulate matter such as dust and flue ash is inletted through inlet 14 at a velocity sufficiently high to keep the particulate matter entrained in the transport medium. The flow splitters formed by the saddle portion 22 of baffles 18 initiate a downward directed vortical flow of the air in the various regions defined by the baffle quadruplets. The lower one-third length of the baffles have outwardly flared surfaces for producing converging flow and cyclonic action within the rotating fluid. As the fluid, within the regions increases in velocity, particles carried by the fluid are removed from the fluid by being emitted by centrifugal action radially outward until they contact the baffles' surface and fall in a gravity feed manner along the surface of the baffle into collector 28. A pressure differential resulting from the increasing velocity of the vortical flow, especially at the apex of the vortex, causes the axial component of the flow direction to reverse from the initial downward direction to an upward direction through the vortex finder tubes 32 to be carried to the outlet 16. Thus, particulate matter entrained within the inletted medium or air flow is separated out of the medium within the regions of rotating vortical flow, and cleansed air is exited through the vortex finder tubes 32 and thus to the output 16.

Figure 2:
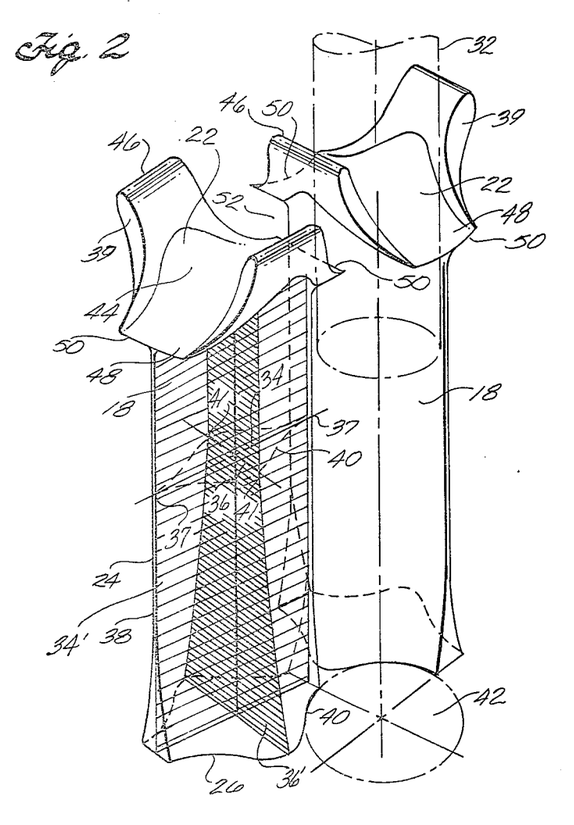
FIG. 2 is a perspective view of two contoured columnar baffles of a quadruplet.

Referring now to FIG. 2, there is shown in perspective view and greater detail two of the four contoured baffles that define the regions of the rotating fluid (to be shown later).

The columnar portion 24 of the baffle 18 has an allochirally symmetrical cross-section about both its major axis plane 34' and its minor axis plane 36'.

The major axis plane 34' and minor axis plane 36' are defind by the locus of major axes 34 and minor axes 36 respectively taken at cross-sections orthogonal to the columnar portion 24. About the major axis plane 34', the cross-section for at least two-thirds of the length of the columnar portion 24 is essentially bell-shaped. About the minor axis plane 36' the cross-section of columnar portion 24 is defined essentially by an ogee-shaped arch.

At a station 38 that is about two-thirds of the length of the columnar portion 24 from the saddle portion 22, the minor axis plane 36' expands continuously and uniformly on either side of the major axis plane 34'. The expansion or flare is defined in cross-sections taken from a station 38 progressively downward to the base portion 26. The columnar portion surface 40, defined in a quadrant between major axis 34 and minor axis 36, defines at least a portion of the region 42 wherein the inletted air flows in a vortical manner. The remaining contoured baffles define the remaining portions of regions 42 of the vortical flow.

The saddle portion 22 is defined by a bell-shaped jockey or seat portion 44 and a pair of allochirally symmetrical lobes 46 extending outwardly and away from the jockey portion. The bell-shaped jockey portion 44 is symmetrical about the minor axis plane 36' (see FIG. 4). The region 48, in the vicinity of the edge 50 of the saddle portion 22, cooperates with the corresponding lobes 46 of a saddle portion of an adjacent baffle to form a converging nozzle 52. The nozzle serves as a flow splitter to firstly direct the inletted flow downwardly into the regions 42 of vortical flow and secondly to split the flow about the minor axis 36 of the baffles 18. The direction downwardly is used merely as an aid in description of the functional qualities of the baffles described in FIG. 2 and is not intended to be restrictive, for as will be shown later in an alternate embodiment of the present invention, horizontally placed contoured baffles in a flow-through arrangement perform a similar air purification function as is presently described.

Figure 3:
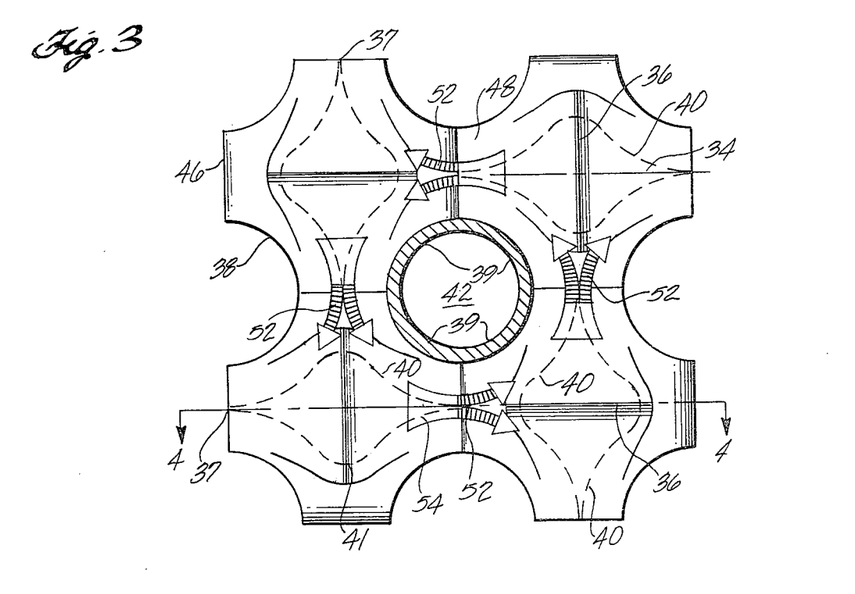
FIG. 3 is a top view of a contoured baffle quadruplet showing the flow splitting of inletted air flow.
Figure 4:
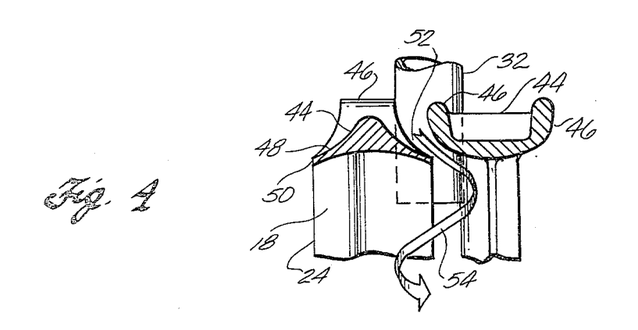
FIG. 4 is a section view taken along plane 4—4 of FIG. 3.

Referring now to FIGS. 3 and 4, there is shown in detail an arrangement of four adjacent baffles of the presently preferred embodiment. In the quadruplet arrangement of FIG. 3, the major axis 34 of a baffle 18 is orthogonal to the major axis 34 of an adjacent baffle 18. As discussed previously, the region 48 of a saddle portion 22 of one baffle cooperates with a lobe 46 of a saddle portion 22 of an adjacent baffle to form a converging nozzle 52. Thus, in the quadruplet arrangement of FIG. 3, four converging nozzles 52 are formed. The flow (shown in dashes) 54 therefore is directed downward (see FIG. 4) and then split in two directions (shown in dashes) about the minor axis 36, said flow conforming to the surface contour 40 of the columnar portion 24 of each baffle 18. The vortex finder tube 32 extends through the opening defined by the arcuate portions 39. The tube 32 serves as a conduit to transfer cleansed air from a central portion of region 42 to the outlet 16. The vortex finder tube 32 has a flow receiving end 33 located just below the baffle saddle portions 22. The arcuate portion 39 of each baffle defines a quadrant of the region 42 taken at the saddle portion 22 of the baffle 18. Similarly, the columnar portion surface 40 is arcuate in nature and defines a portion of the region 42 of the rotating fluid along the length of said columnar portion 24. Thus, fluid entering each baffle quadruplet is directed in a rotary or rotational flow manner within the regions 42 defined by such four contoured baffles.

Referring to FIG. 4, there is shown in cross-section two baffles 18 taken in section about line A—A of FIG. 3. As previously described, the flow 54 is initially directed downwards by means of the converging nozzle or flow splitter 52. The flow splitter 52 comprises lobe 46 of one baffle and the region 48 of an adjacent saddle 22. The flow is split again and divided about the minor axis 36 of baffle 18. The effect of the flow splitters is therefore to initiate vortical flow of the inletted fluid in a downward direction.

Figure 5:
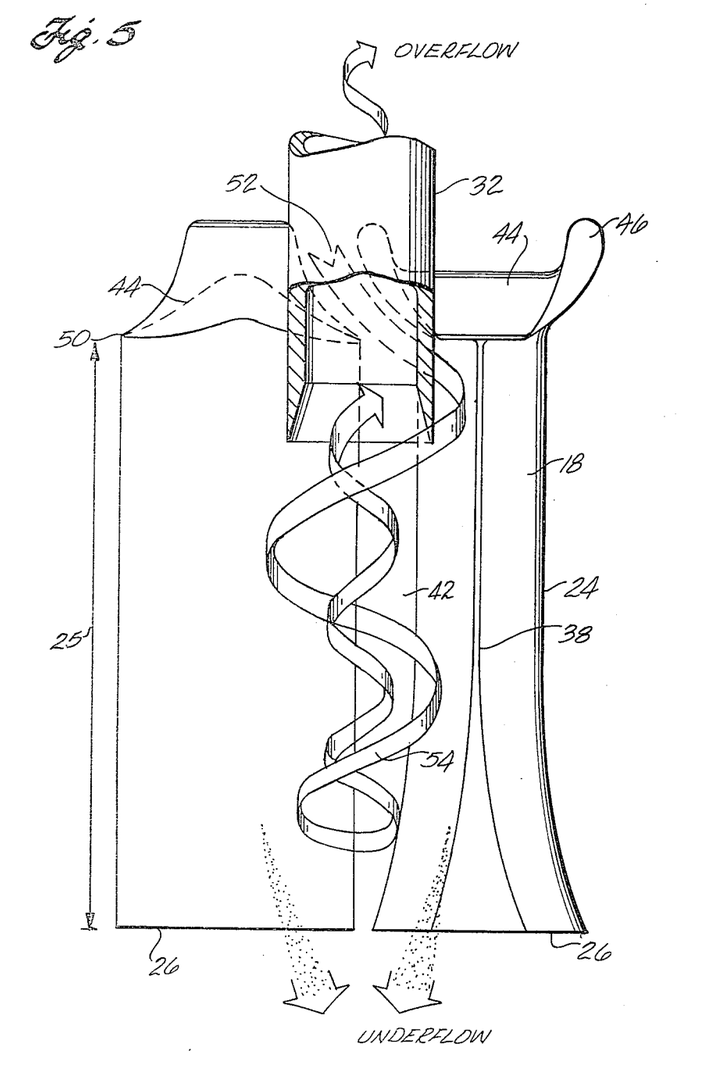
FIG. 5 is a side elevation view of two flared contoured columnar baffles.
Figure 6:
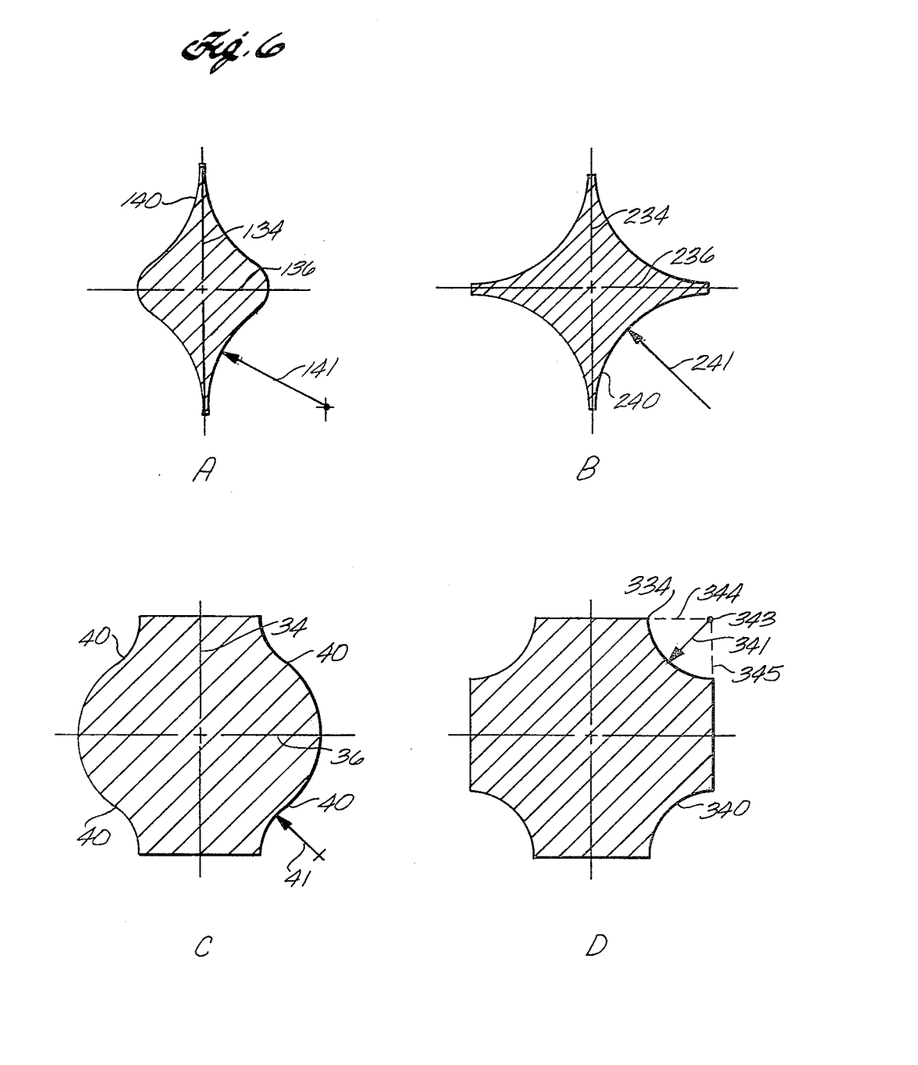
FIG. 6 is a cross-sectional view of the columnar portion of four embodiments of the contoured columnar baffles.
Figure 7:
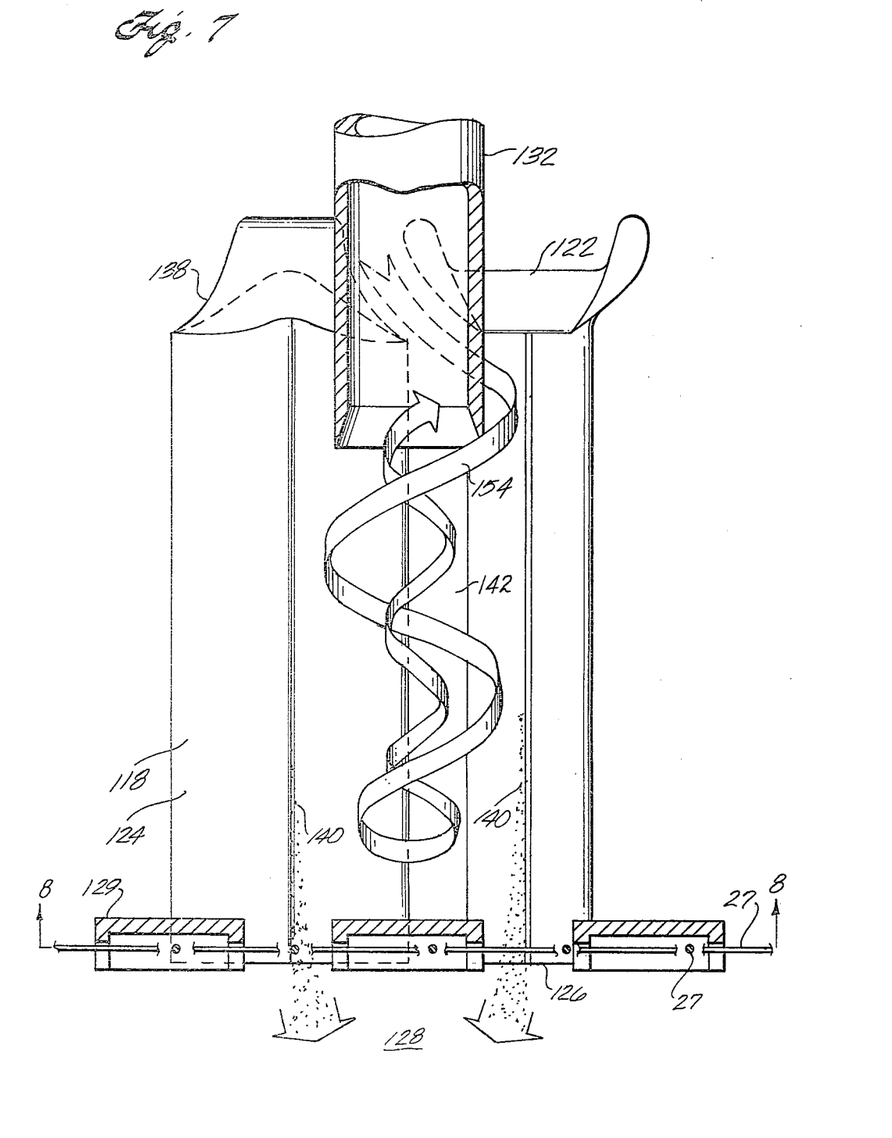
FIG. 7 is a side elevation view of two contoured columnar baffles having a constant cross-section.
Figure 8:
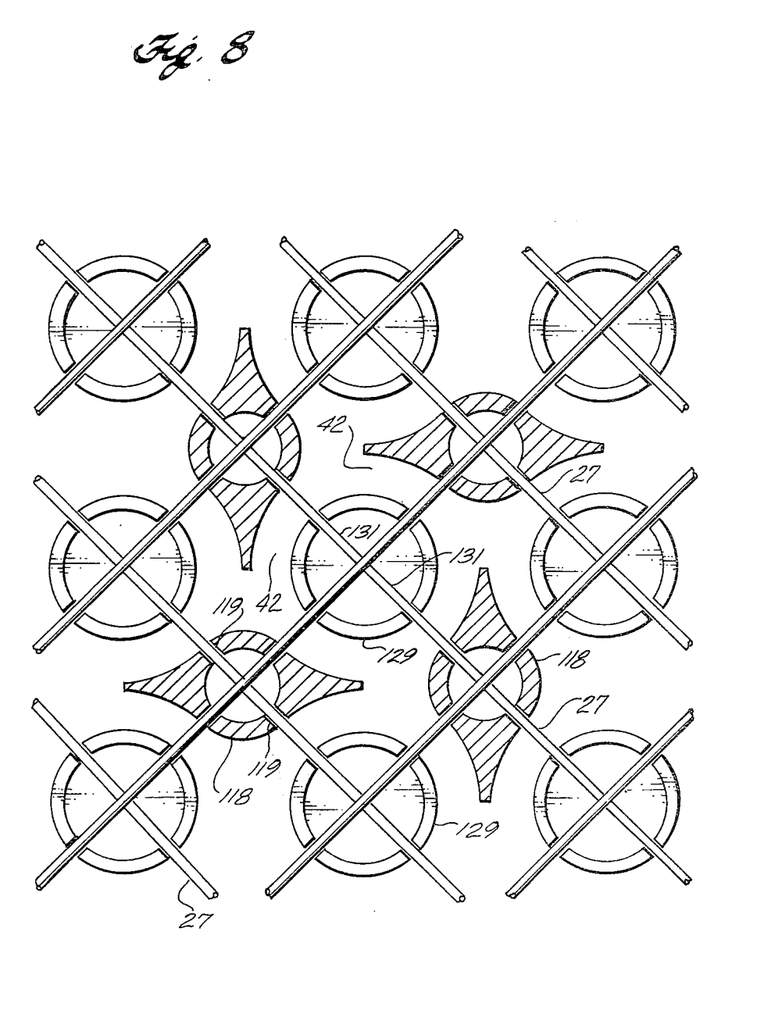
FIG. 8 is a partial view of the core busters, baffles and supporting screen taken along plane 8—8 of FIG. 7.
Figure 9:
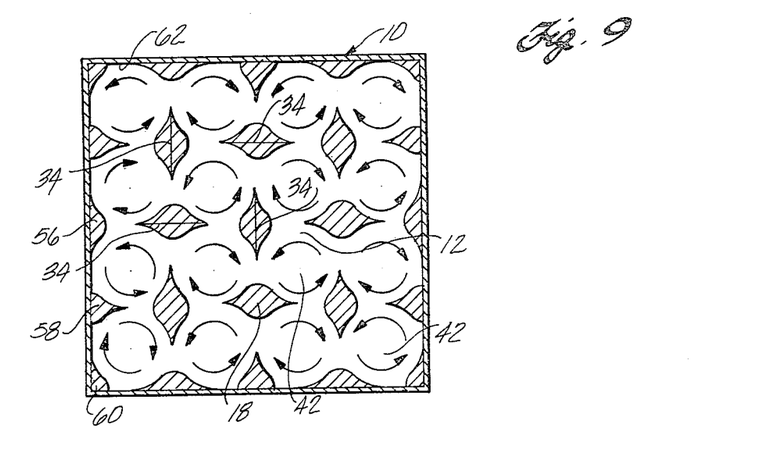
FIG. 9 is a top view of the multi-vortical separator chamber taken along plane 9—9 of FIG. 1.

Referring now to FIG. 5, there is shown two flared contoured baffles 18 configured to produce converging vortical flow and cyclonic action. The columnar portion 24 of the baffle 18 is outwardly flared with the flare commencing at a station 38. Station 38 is located between the saddle and base portion 26 at a distance of about one-third the length 25 of the columnar portion 24 as measured from the base portion.

As the flow 54 enters the converging nozzle or flow splitter 52, it is directed initially downward and split in a rotary fashion as previously described. Due to the flare of each contoured baffle, the region of rotating fluid 42 is reduced in a radially inward manner at stations progressively closer to the base portion 26. Due to conservation of momentum principle as the radius of flow decreases, the velocity of flow increases. As a result of the centrifugal action of the increased flow speed, particles carried by the flow or transport medium 54 are emitted therefrom, the particles impinging the surfaces 40 of each columnar portion 24 and falling in a gravity fall manner into a collection bin 28. The collection bin 28 is located below the base portion 26 of the contoured baffles 18.

In addition to the flare of the baffles, a boundary layer is created along the surfaces 40 of columnar portion 24. This boundary layer adds to the flare, the net effect of such increased flare is that the region of rotating fluid 42 is reduced again radially inward at stations taken progressively closer to the region of the base portion 26. Due to the reduced region of rotating fluid 42, the rotary speed of the flow is such that a pressure differential, between the fluid in a flared portion of the columnar baffle 18 and a point upstream from said flared portion, is in a direction to cause the downward direction of the flow to reverse and change to an upward direction through the center of the vortex. The flow which is cleansed of particulate matter enters the vortex finder tube 32 to be transferred to the outlet portion 16 of the separator.

In the presently preferred embodiment, the removal of particulate matter in the range of between 2 to 10 microns in size from the transport medium such as desirable for coal burners discharging into a gas turbine can be accomplished with a vortex diameter in the range of about 4 to 8 inches. The length of the baffles 18 required to produce 4 to 8 inch diameter cyclonic flow, is in the range of about 12 to 24 inches as measured from the top of the saddle portion 22 to the base portion 26.

Figure 10:
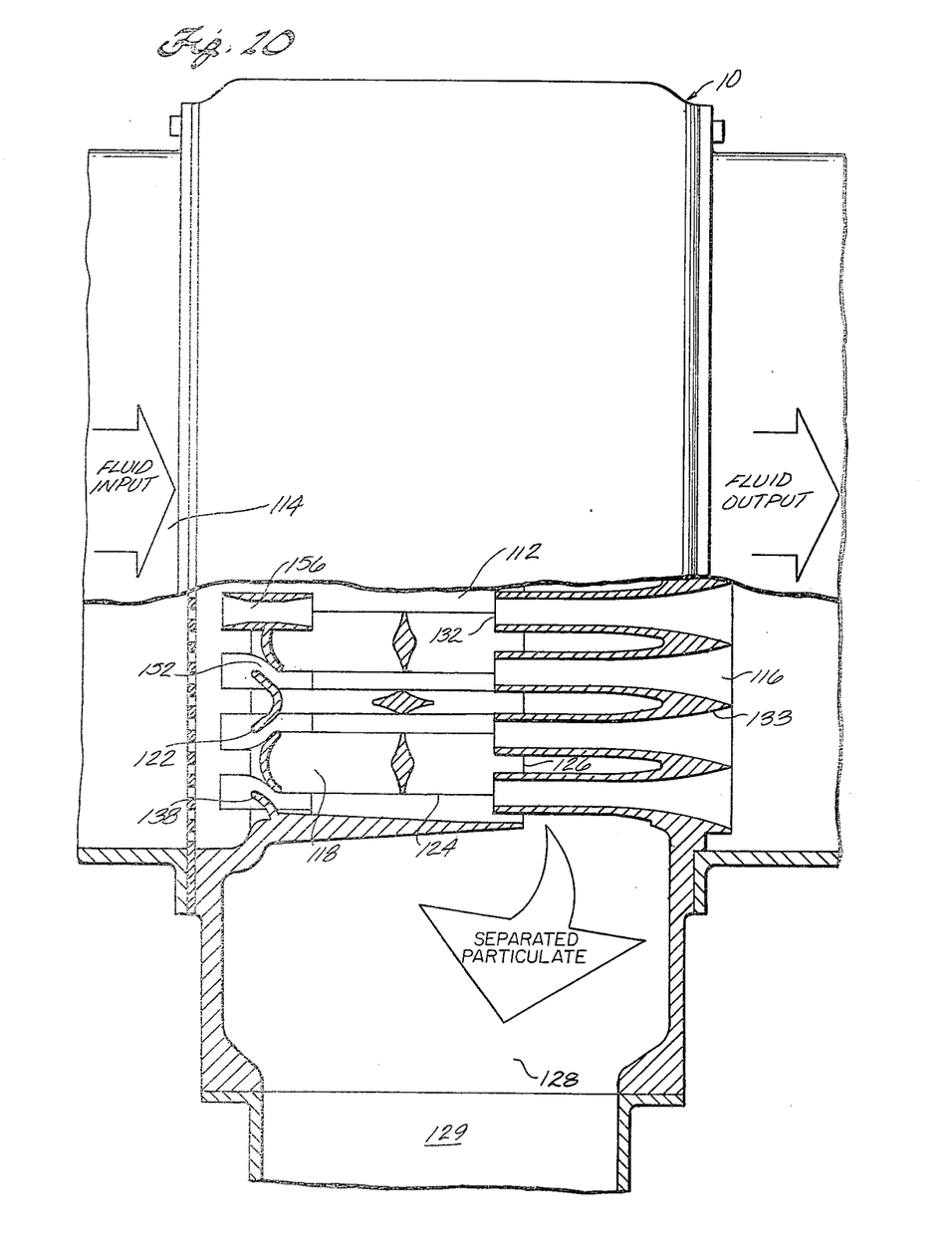
FIG. 10 is a partial cut away view of an alternate construction of the preferred embodiment.

At the interspace between the leading edge 37 and the trailing edge 41 of adjacent baffles, the boundary layer at the edges of each quadrant of the flow is interrupted. The boundary layer that is created in each quadrant is small, and narrow wakes (secondary flow) extending from the trailing edges 37 of the baffles 18 dissipate across the interspaces. A new boundary layer builds up from a stagnation point located at the leading edge 41 of an adjacent downstream baffle. Due to the interspace between the baffle trailing edge 37 and the leading edge diesel engines and other combustion devices, the defoaming of oil, and for certain resource recovery applications. The multi-vortical separator is enclosed in enclosure 110. Within the enclosure 110 is chamber 112 having an inlet 114, an outlet 116 and a plurality of contoured columnar baffles 118. Below the columnar baffles is chamber 128 which serves as a particle collector for particles separated out of the transport medium or airflow. As previously discussed, the contoured columnar baffles 118 define a plurality of regions containing fluid flow rotating in a vortical manner. Located within a central portion of the regions are a plurality of vortex finder tubes 132. The vortex finder tubes provide a conduit for cleansed air rotating in the central portion of the regions 142 to the outlet 116. The outlet portion 133 of the vortex finder tube 132 is in the shape of an outwardly flared diffuser in order to enhance the aerodynamic efficiency by the vortex finder tubes and for pressure recovery. The contoured columnar baffles 118 are arranged in the manner previously described and shown in FIG. 3.

Operation of this alternate construction of the preferred embodiment is identical to that previously disclosed, namely, air or other transport medium carrying therein particulate matter enters the multi-vortical separator at inlet 114. The flow splitters or converging nozzles formed by the saddle and lobe portions of adjacent baffles in each quadruplet cause the inletted fluid to rotate in a vortical manner in the regions defined by the surfaces of the columnar portions 124 of adjacent baffles. Particulate matter emitted from such a vortical flow is forced downstream in the boundary layer and falls in a gravity manner into the collection chamber 128. The purified air enters the vortex finder tubes 132 at a station upstream from the base portions 126 of the contoured baffles 118. The purified air is carried to the outlet 116 wherein it is appropriately discharged. The removal of separated matter from the multi-vortical separator can be accomplished in any of a number of conventional manners such as connecting a low pressure-sealed bin 129 to receive the separated matter falling into the chamber 128.

Air or other particulate matter carrying transport medium may be admitted into the region of rotating fluid directly by the use of core admission tubes 156. The tubes 156 conform to the circular profile defined by the arcuate portions 139 of adjacent contoured baffles 118 arranged in the quadruplet configuration as shown in FIG. 3. The core admission tubes are in fluid parallel communication with the flow entering the flow splitters defined by the saddle portions of adjacent baffles 118. The hollow core admission tubes 156 admit air directly to the vortex core bypassing the flow splitters 152 in order to increase the volume flow through the multi-vortical separator.

The baffles 118 extend into the multi-vortical separator chamber 112 in a cantilever arrangement. The baffles 118 are maintained in quadruplet placement by means of contact with the core admission tubes 156. The core admission tubes 156 also form a brace against which the baffles 118 abut and are maintained in a cantilever arrangement.

While the basic principle of this invention has been herein illustrated along with one embodiment, it will be appreciated by those skilled in the art that variations in the disclosed arrangement both as to its details and as to the organization of such details may be made without departing from the spirit and scope thereof. Accordingly, it is intended that the foregoing disclosure and the showings made in the drawings will be considered only as illustrative of the principles of the invention and not construed in a limiting sense.

What is claimed is:

1. Apparatus for centrifugally separating particulate matter suspended in a fluid and for collecting the separated matter at a point of collection comprising:
    a chamber having an inlet and an outlet;
    means for introducing the fluid into the chamber through the inlet;
    a plurality of spaced apart, elongated contoured columnar baffles within the chamber, the baffles each having approximately the same cross-section, each cross-section having a major axis, the baffles being arranged such that the major axes of adjacent baffles are at substantially right angles to each other, forming an elongated region extending between said baffles and having a length extending generally along the length of the baffles;
    means for introducing fluid in the chamber into an end of said region so that the fluid flows generally along the length of said region, said baffles being shaped for causing the fluid to rotate vortically about a vortex axis as it flows along said region;
    means for guiding fluid from said region to the outlet; and
    means for guiding separated particulate matter to the point of collection.

2. The apparatus of claim 1 wherein the plurality of spaced apart contoured baffles defines at least four regions of counter rotating vortices, each vortex having a vortex axis.

3. The apparatus according to claim 2 wherein the columnar surface of the baffles provides a guide surface for guiding particulate matter impinging thereupon to the point of collection, said matter being emitted from the rotating vortices by centrifugal action.

4. The apparatus according to claim 3 wherein the baffles completely isolate adjacent vortices.

5. The apparatus according to claim 4 wherein the columnar portion has a quadrilaterally symmetrical cross-section, the cross-section in the shape of a four-pointed star having concave arcuate portions defining the perimeter between adjacent points, the radius of the arcuate portion defining the radius of at least a portion of the region of rotating fluid.

6. The apparatus according to claim 4 wherein the columnar portion has a quadrilaterally symmetrical cross-section, the cross-section in the shape of a square, each corner thereof defined by a concave arcuate cusp, the radius of the cusp defining at least a portion of the region of rotating fluid, the center line of the radius located at the intersection of the projection of the sides of the square cross-section.

7. The apparatus according to claim 3 wherein the columnar portion has mutually orthogonal major and minor axes, the columnar portion having a bell-shaped cross-section allochirally symmetrical about the major axis.

8. The apparatus according to claim 3 wherein the baffle has a vortical flow inducing saddle portion, a base portion and a columnar portion located between the saddle portion and the base portion, the columnar portion having a length measured between the saddle portion and the base portion, said columnar portion having a cross-section taken transverse to said columnar portion characterized by allochiral bell-shaped symmetry for essentially the length of the columnar portion, the cross-section of said columnar portion being flared in the vicinity of the base portion, the bell-shaped cross-section defining at least a portion of a region of rotating fluid, the flared cross-section producing converging vortical flow in the fluid while conserving momentum within the fluid.

9. The apparatus of claim 8 wherein the means for guiding fluid from a central portion of each region to the outlet includes, a hollow tube essentially centered within each region, the tube having a first and second end, the first end of the tube located between the baffle base portion and the saddle portions, the first end for receiving cleansed fluid from a central portion of the vortex, the second end of the tube located in the vicinity of the chamber outlet and communicating therewith so that fluid entering the first end passes through the tube to be discharged from the apparatus through the chamber outlet.

10. The apparatus of claim 9 including an output plenum region for receiving cleansed fluid exhausted at the second end of the hollow tubes, said plenum region in fluid communication with the chamber outlet such that cleansed air within the plenum region passes through the chamber outlet.

11. The apparatus according to claim 8 wherein the symmetrical bell-shaped cross-section has a mutually orthogonal major axis plane and a minor axis plane, the cross-section being bell-shaped symmetrically about the major axis plane, the ends of the axes defining at each cross-section the location of the outer extremities of the columnar and base portions taken at such a cross-section, the columnar portion flared such that the minor axis of the cross-section continously increases as the cross-sections are taken progressively closer to the base, said flare commencing at a station located between the saddle portion and the base portion at a distance of about one-third of the length of the columnar portion, said distance measured from the base portion.

12. The apparatus of claim 11 wherein the bell-shaped cross-section is defined by a convex arcuate portion spaced between two concave arcuate portions, the radius of the concave portion defining the radius of a vortex, the vortex taken in a plane orthogonal to the columnar portion, the intersection of such a plane and the columnar portion defining the radii of the concave arcuate portions.

13. The apparatus of claim 12 wherein at least four baffles in a quadruplet arrangement define a region of rotating fluid therebetween.

14. The apparatus of claim 13 wherein each baffle has its major axis plane orthogonal to the major axis plane of an adjacent baffle, each baffle spaced equidistant from adjacent baffles.

15. The apparatus of claim 14 wherein the means for introducing fluid in the chamber into an end of said region comprises the saddle portions of the at least four baffles arranged to define four flow splitters for initiating the rotation of the fluid within the region of rotating fluid defined by said at least four baffles.

16. The apparatus of claim 15 wherein the flow splitters split inletted fluid in a first direction downward into the regions, thence splitting said downwardly directed inletted fluid in second and third outward and mutually opposite directions, said second and third opposite directions for fluid counter-rotation in adjacent regions.

17. The apparatus according to claim 16 further including means for bypassing the flow splitters and for carrying fluid introduced into the chamber directly into the regions of rotating fluid.

18. The apparatus of claim 16 wherein the saddle portion has a symmetrical jockey portion, said jockey portion having a bell-shaped upper surface symmetrical in the minor axis plane of the columnar portion; and a pair of allochirally symmetrical lobes extending outwardly and away from the jockey portion, said lobes being symmetrical about the major axis plane of the columnar portion, the saddle having arcuate corners between the lobes and the jockey portion.

19. The apparatus of claim 18 wherein a plurality of contoured baffle half and quarter sections are located at the chamber's inner wall, certain of which half-sections taken to one side of the major axis plane, certain of which half-sections taken to one side of the minor axis plane, said half-sections taken to the side of the major and minor axis alternately placed along the chamber inner wall, the quarter-sections taken in the quadrant between the minor and major axis planes, the quarter-sections located at corners of the chamber such that said sections define at least a portion of the regions of counter-rotating fluid.

20. The apparatus of claim 19 including contoured baffle supporting cross-beams, said cross-beams removably insertable within the chamber, the cross-beams extending across the chamber supporting a plurality of contoured baffles located thereon, the baffles loosely placed within the chamber resting by gravity upon said cross-beams.

21. The apparatus of claim 20 including a collector located at the point of collection of the particulate emitted from the vortices, the point of collection located below the contoured baffles, said particulate falling into the collector in a gravity fall manner.

22. The apparatus of claim 21 wherein the contoured baffles are prismatic from the saddle portion to about two-thirds of the length of the columnar portion, the remaining about one-third of the length of the columnar portion being outwardly flared with respect to the minor axis for displacing the rotational flow radially inward toward a region center.

23. The apparatus of claim 22 wherein the major axis of the contoured baffles is at least equal to the distance between the centers of adjacent regions.

24. The apparatus of claim 23 wherein the ratio of the major axis to the minor axis is about 2 to 1, such ratio producing helical vortical flow within the regions.

25. Apparatus for centrifugally separating particulate matter entrained in a fluid comprising:
a chamber having an inlet and an outlet;
means for inletting the fluid into the chamber;
a plurality of separators for cleansing inletted fluid of entrained particles, said separators located in the chamber and in fluid communication with the inletted fluid, each separator comprising no more than a quadruplet of contoured columnar baffles, each baffle forming at least a quarter section of adjacent separators, said baffles shaped for causing fluid to rotate in said separators;
means for introducing, in a vertical flow manner, the inletted fluid into the separators;
means for guiding the cleansed fluid within the separators to the outlet; and
means for collecting the separated particles.

26. The apparatus according to claim 25 wherein the means for collecting the separated particles includes a collector and the columnar surface of the baffles provides a guide surface for guiding particulate matter impinging thereupon to the collector, said matter being emitted from the rotating vortices by centrifugal action.

27. The apparatus of claim 25 wherein the means for introducing inletted fluid into the separators, in a vortical flow manner, includes a plurality of flow splitters, each baffle forming a portion of a flow splitter.

28. The apparatus of claim 27 further including means for bypassing the flow splitters and for carrying fluid introduced into the chamber directly into the regions of rotating vortices.

29. The apparatus of claim 27 wherein the flow splitters direct inletted fluid in a first direction into the separators, thence directing the fluid in a rotary direction within the separator.

30. The apparatus of claim 29 wherein the flow splitters direct the fluid in a counter-rotational direction in adjacent separators.

31. The apparatus of claim 30 wherein the contoured baffles define at least four separators, each separator defining a region of rotating vortices, each vortex having a vortex axis, the vortices rotating in counter-rotation in adjacent separators.

32. The apparatus of claim 31 wherein said baffles each have approximately the same allochiral cross-section, each cross-section having a major axis, said baffles oriented such that the major axes of adjacent baffles are substantially at right angles to each other, said baffles creating a fluid dynamic force between the individual vortices thereby preventing particulate matter suspended in the vortex of one separator from migrating to the vortex of an adjacent separator.

33. The apparatus of claim 30 wherein each baffle forming a portion of a flow splitter has a saddle, the saddle for guiding the inletted fluid into the separators.

34. The apparatus according to claim 33 wherein the baffles further include a base portion and a columnar portion located between the saddle and the base portion, said columnar portion having a cross-section taken transverse to said columnar portion characterized by allochiral bell-shaped symmetry for essentially the length of the columnar portion, the cross-section of said columnar portion being flared in the vicinity of the base portion, the bell-shaped cross-section defining at least a portion of a region of rotating fluid, the flared cross-section producing converging vortical flow in the fluid while conserving momentum within the fluid.

35. The apparatus of claim 34 wherein the means for guiding fluid cleansed of entrained particles to the outlet includes, a hollow tube essentially centered within each region, the tube having a first and a second end, the first end of the tube located between the baffle base portion and the saddle, the first end for receiving cleansed fluid from a central portion of the vortex, the second end of the tube located in the vicinity of the chamber outlet and communicating therewith so that fluid entering the first end passes through the tube to be discharged from the second end and thence from the apparatus through the chamber outlet.

36. The apparatus of claim 35 including an output plemum region for receiving cleansed fluid exhausted at the second end of the hollow tubes, said plenum region in fluid communication with the chamber outlet such that cleansed air within the plenum region passes to the chamber outlet.

37. The apparatus according to claim 34 wherein the symmetrical bell-shaped cross-section has a mutually orthogonal major axis plane and a minor axis plane, the cross-section being bell-shaped symmetrically about the major axis plane, the ends of the axes defining at each cross-section the location of the outer extremities of the columnar and base portions taken at such a cross-section, the columnar portion flared such that the minor axis of the cross-section continuously increases as the cross-sections are taken progressively closer to the base, said flare commencing at a station, said station located between the saddle and the base portion at a distance of about one-third of the length of the columnar portion, said distance measured from the base portion.

38. The apparatus of claim 37 wherein the bell-shaped cross-section is defined by a convex arcuate portion spaced between two concave arcuate portions, the radius of the concave portion defining the radius of a vortex, the vortex taken in a plane orthogonal to the columnar portion, the intersection of such a plane and the columnar portion defining the radii of the concave arcuate portions.

39. The apparatus of claim 38 wherein each baffle has its major axis plane orthogonal to the major axis plane of an adjacent baffle, each baffle spaced equidistant from adjacent baffles.

40. The apparatus of claim 39 wherein the saddle has a symmetrical jockey portion, said jockey portion having a bell-shaped upper surface symmetrical in the minor axis plane of the columnar portion; and a pair of allochirally symmetrical lobes extending outwardly and away from the jockey portion, said lobes being symmetrical about the major axis plane of the columnar portion, the saddle having arcuate corners between the lobes and the jockey portion.

41. The apparatus of claim 40 wherein a plurality of contoured baffle half and quarter sections are located at the chamber's inner wall, certain of which half-sections taken to one side of the major axis plane, certain of which half-sections taken to one side of the minor axis plane, said half-sections taken to the major and minor axis being alternately placed along the chamber inner wall, the quarter-sections taken in the quadrant between the minor and major axis planes, the quarter-sections located at corners of the chamber such that said sections define at least a portion of the regions of counter-rotating fluid.

42. The apparatus of claim 41 including a collector located at the point of collection of the particulate emitted from the vortices, the point of collection located below the contoured baffles, said particulate falling into the collector in a gravity fall manner.

43. The apparatus of claim 42 wherein the contoured baffles are prismatic from the saddle to about two-thirds of the length of the columnar portion, the remaining about one-third of the length of the columnar portion being outwardly flared with respect to the minor axis for displacing the rotational flow radially inward toward a region center.

44. The apparatus of claim 43 wherein the major axis of the contoured baffles is at least equal to the distance between the centers of adjacent regions.

45. The apparatus of claim 44 wherein the ratio of the major axis of the minor axis is about 2 to 1, said ratio producing helical vortical flow within the regions.

46. The apparatus according to claim 45 wherein the columnar portion has mutually orthogonal major and minor axes, the columnar portion having a bell-shaped cross-section allochirally symmetrical about the major axis.

47. The apparatus according to claim 45 wherein the baffles completely isolate adjacent vortices.

48. The apparatus according to claim 47 wherein the columnar portion has a quadrilaterally symmetrical cross-section, the cross-section in the shape of a four-pointed star having concave arcuate portions defining the perimeter between adjacent points, the radius of the arcuate portion defining the radius of at least a portion of the region of rotating fluid.

49. The apparatus according to claim 49 wherein the columnar portion has a quadrilaterally symmetrical cross-section, the cross-section in the shape of a square, each corner thereof defined by a concave arcuate cusp, the radius of the cusp defining at least a portion of the region of rotating fluid, the center line of the radius located at the intersection of the projection of the sides of the square cross-section.

50. An apparatus for separating out particles entrained in a fluid comprising:
a chamber having an inlet and an outlet;
one or more separators located within the chamber, the separator comprising a plurality of elongated contoured columnar baffles, said baffles defining an elongated region extending between said baffles and having a length extending generally along the length of the baffle region, the baffles shaped for causing the fluid within the regions to rotate in a vortical manner, the separator having an opening for providing fluid communication with an adjacent separator;
flow splitter means for directing inletted flow into an end of the separator so that the fluid flows generally along the length of said region and rotates vortically about a vortex axis as it flows along said region;
means for discharging the cleansed air with the separator to the chamber outlet; and
means for collecting the separated particles.

51. The apparatus of claim 50 wherein the baffles are identical, each baffle has an elongated cross-section that defines a major axis, the baffles are arranged in spaced apart rows and columns such that the major axes of adjacent baffles are orthogonal to each other.

52. The apparatus of claim 50 wherein the plurality of contoured baffles defines at least four regions of counter-rotating vortices.

53. The apparatus of claim 52 wherein said baffles each have approximately the same allochiral cross-section, each cross-section having a major axis, said baffles oriented such that the major axes of adjacent baffles are at right angles to each other, said baffles creating a fluid dynamic force between the individual vortices thereby preventing particulate matter suspended in one vortex from migrating to another vortex.

54. The apparatus of claim 53 wherein the flow splitter means includes a plurality of flow splitters, each baffle defining at least a quarter section of a flow splitter.

55. The apparatus of claim 54 wherein the flow splitters direct inletted fluid in a first direction into the separators, thence directing the fluid in a rotary direction within the separator.

56. The apparatus according to claim 55 further including means for bypassing the flow splitters and for carrying fluid introduced into the chamber directly into the region of rotating vortices.

57. The apparatus of claim 55 wherein the flow splitters direct the fluid in a counter-rotational direction in adjacent separators.

58. The apparatus of claim 57 wherein the contoured baffles define at least four separators, each separator defining a region of rotating vortices, each vortex having a vortex axis, the vortices rotating in counter-rotation in adjacent separators.

59. The apparatus according to claim 58 wherein the means for collecting the separated particles includes a collector located at a point of collection of the particulate emitted from the vortices, the point of collection located below the contoured baffles, said particulate falling into the collector in a gravity fall manner, and wherein the exterior columnar surface of the baffles provides a guide surface for guiding particulate matter impinging thereupon to the point of collection.

60. The apparatus according to claim 58 wherein each baffle has a saddle, the saddle for guiding the inletted fluid into the separator, said saddle cooperating with its corresponding baffle such that the inletted fluid is guided into each separator in a vortical manner.

61. The apparatus according to claim 60 wherein the baffle further includes a base portion and a columnar portion located between the saddle and the base portion, said columnar portion having a cross-section taken transverse to said columnar portion characterized by allochiral bell-shaped symmetry for essentially the length of the columnar portion, the cross-section of said columnar portion being flared in the vicinity of the base portion, the bell-shaped cross-section defining at least a portion of a region of rotating fluid, the flared cross-section producing converging vortical flow in the fluid while conserving momentum within the fluid.

62. The apparatus of claim 61 wherein the means for guiding fluid cleansed of entrained particles to the outlet includes, a hollow tube essentially centered within each region, the tube having a first and a second end, the first end of the tube located between the base portion and the saddle, the first end for receiving cleansed fluid from a central portion of the vortex, the second end of the tube located in the vicinity of the chamber outlet and communicating therewith so that fluid entering the first end passes through the tube to be discharged from the apparatus through the chamber outlet.

63. The apparatus of claim 62 including an output plenum region for receiving cleansed fluid exhausted at the second end of the hollow tubes, said plenum region in fluid communication with the chamber outlet such that cleansed air within the plenum region passes through the chamber outlet.

64. The apparatus according to claim 61 wherein the symmetrical bell-shaped cross-section has a mutually orthogonal major axis plane and a minor axis plane, the cross-section being bell-shaped symmetrically about the major axis plane, the ends of the axes defining at each cross-section the location of the outer extremities of the columnar and base portions taken at such a cross-section, the columnar portion flared such that the minor axis of the cross-section continuously increases as the cross-sections are taken progressively closer to the base, said flare commencing at a station, said station located between the saddle and the base portion at a distance of about one-third of the length of the columnar portion, said distance measured from the base portion.

65. The apparatus of claim 64 wherein the bell-shaped cross-section is defined by a convex arcuate portion spaced between two concave arcuate portions, the radius of the concave portion defining the radius of a vortex, the vortex taken in a plane orthogonal to the columnar portion, the intersection of such a plane and the columnar portion defining the radii of the concave arcuate portions.

66. The apparatus of claim 65 wherein each baffle has its major axis plane orthogonal to the major axis plane of an adjacent baffle, each baffle spaced equidistant from adjacent baffles.

67. The apparatus of claim 65 wherein the saddle has a symmetrical jockey portion, said jockey portion having a bell-shaped upper surface symmetrical in the minor axis plane of the columnar portion; and a pair of allochirally symmetrical lobes extending outwardly and away from the jockey portion, said lobes being symmetrical about the major axis plane of the columnar portion, the saddle having arcuate corners between the lobes and the jockey portion.

68. The apparatus of claim 67 wherein a plurality of contoured baffle half and quarter sections are located at the chamber's inner wall, certain of which half-sections taken to one side of the major axis plane, certain of which half-sections taken to one side of the minor axis plane, said half-sections taken to the side of the major and minor axis alternately placed along the chamber inner wall, the quarter-sections taken in the quadrant between the minor and major axis planes, the quarter-sections located at corners of the chamber such that said sections define at least a portion of the regions of counter-rotating fluid.

69. The apparatus of claim 68 wherein the contoured baffles are prismatic from the saddle to about two-thirds of the length of the columnar portion, the remaining about one-third of the length of the columnar portion being outwardly flared with respect to the minor axis for displacing the rotational flow radially inward toward a region center.

70. The apparatus of claim 69 wherein the major axis of the contoured baffles is at least equal to the distance between the centers of adjacent regions.

71. The apparatus of claim 70 wherein the ratio of the major axis to the minor axis is about 2 to 1, said ratio producing helical vortical flow within the regions.

72. The apparatus according to claim 71 wherein the baffles completely isolate adjacent vortices.

73. The apparatus according to claim 72 wherein the columnar portion has a quadrilaterally symmetrical cross-section, the cross-section in the shape of a four-pointed star having concave arcuate portions defining the perimeter between adjacent points, the radius of the arcuate portion defining the radius of at least a portion of the region of rotating fluid.

74. The apparatus according to claim 73 wherein the columnar portion has a quadrilaterally symmetrical cross-section, the cross-section in the shape of a square, each corner thereof defined by a concave arcuate cusp, the radius of the cusp defining at least a portion of the region of rotating fluid, the center line of the radius located at the intersection of the projection of the sides of the square cross-section.

75. The apparatus according to claim 74 wherein the columnar portion has mutually orthogonal major and minor axes, the columnar portion having a bell-shaped cross-section allochirally symmetrical about the major axis.

* * * * *

UNITED STATES PATENT AND TRADEMARK OFFICE
CERTIFICATE OF CORRECTION

PATENT NO. : 4,263,027

DATED : April 21, 1981

INVENTOR(S) : Joseph Varnas & Horst Schneider

It is certified that error appears in the above—identified patent and that said Letters Patent is hereby corrected as shown below:

Column 1, Lines 11 and 12, delete second occurrence of "for removing". Column 2, Line 38, "as" second occurrence should read --at--. Col. 7, line 41, "th" should read -- the --. Column 8, Line 28, "separation" should read -- separated --. Column 12, Line 61, Claim 25, "vertical" should read -- vortical --. Column 14, Line 39, Claim 41, after "the" insert -- side of the --; Line 62, Claim 45, "of" should read -- to --. Column 15, Line 10, Claim 49, change second occurrence of "49" to -- 48 --; Line 37, Claim 50, "with" should read -- within --.

Signed and Sealed this

Twentieth Day of October 1981

[SEAL]

Attest:

Attesting Officer

GERALD J. MOSSINGHOFF

Commissioner of Patents and Trademarks